United States Patent
Uneta

(10) Patent No.: US 6,530,349 B2
(45) Date of Patent: Mar. 11, 2003

(54) TWO-CYCLE INTERNAL COMBUSTION ENGINE

(75) Inventor: Hisashi Uneta, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/899,173

(22) Filed: Jul. 6, 2001

(65) Prior Publication Data
US 2002/0007807 A1 Jan. 24, 2002

(30) Foreign Application Priority Data

Jul. 7, 2000 (JP) ........................................ 2000-206266
Dec. 20, 2000 (JP) ........................................ 2000-387864

(51) Int. Cl.$^7$ ............................................... F02B 33/04
(52) U.S. Cl. ...................................................... 123/73 C
(58) Field of Search .......................... 123/73 C, 73 CA, 123/73 CB, 73 CC

(56) References Cited

FOREIGN PATENT DOCUMENTS

JP      A10325323      12/1998

Primary Examiner—Noah P. Kamen
(74) Attorney, Agent, or Firm—Birch, Stewart, Kolasch & Birch, LLP

(57) ABSTRACT

To provide a two-cycle internal combustion engine including a combustion chamber; a chamber portion adjacent to the combustion chamber; a communication passage between the combustion chamber and the chamber portion; and a control valve, provided in the communication passage, for opening the communication passage nearly at a point of time when a scavenging opening is closed and closing the communication passage at a mid point in the compression stroke, wherein an air-fuel mixture flows from the chamber portion side into the combustion chamber via the communication passage by operating the control valve, which engine is intended to eliminate scattering of fuel in the chamber portion due to splashing of part of the stream of fuel sprayed from a fuel injector. A portion, on the chamber portion side, of the communication passage is taken as a gas passage for communicating the control valve to the chamber portion. A fuel injector for injecting fuel is provided at a mid point in the gas passage via a connection passage in such a manner as to be directed to the inner wall surface of the gas passage while being slightly tilted toward the control valve. A fuel sump recess is provided in a cylinder block at a boundary between the control valve and the gas passage, and fuel is injected in the recess.

14 Claims, 13 Drawing Sheets

TWO-CYCLE INTERNAL COMBUSTION ENGINE

BACKGROUND OF THE INVENTION

1. Field of the Invention

The present invention relates to a two-cycle internal combustion engine configured to prevent blow-by of an air-fuel mixture in a combustion engine for enhancing the combustion stability, fuel consumption, and exhaust gas purifying performance. In particular, the present invention is directed to a two-cycle internal combustion engine in which a chamber portion is disposed adjacent to a combustion chamber, a communication passage is provided between the combustion chamber and the chamber portion, and a control valve for openably/closably controlling the communication passage is disposed in the communication passage, wherein fuel or an air-fuel mixture is supplied into the combustion chamber via the communication passage.

2. Description of Background Art

In conventional two-cycle internal combustion engines, a blow-by phenomenon often occurs, wherein an air-fuel mixture supplied into the combustion chamber via the crank chamber is discharged through the exhaust passage. To solve such a problem, the present applicant has disclosed a two-cycle internal combustion engine in Japanese Patent Laid-open No. Hei 10-325323.

FIG. 12 of the present invention is a longitudinal sectional view of the internal combustion engine disclosed in the above-described document, and FIG. 13 is a horizontal sectional view cut along a cross-sectional plane passing through the rotary valve shown in FIG. 12. Referring to these figures, a communication passage for communicating a combustion chamber 013 to a chamber portion 029 is provided in a cylinder block 003, and a control valve for openably/closably controlling the communication passage is disposed in the communication passage. The communication passage is composed of two first communication passages 030 for allowing high compression gas to flow from the combustion chamber 013 to the chamber portion 029, and one second communication passage 033 for allowing an air-fuel mixture to flow from the chamber portion 029 to the combustion chamber 013. The control valve is composed of two first control valves 038 provided in the first communication passages 030, and one second control valve 037 provided in the second communication passage 033.

The first control valves 038 open the first communication passages 030 nearly at a point of time when an exhaust opening is closed. The first control valves close the first communication passages 030 at a mid point in the compression stroke. The second control valve 037 opens the second communication passage 033 nearly at a point of time when a scavenging opening is closed and closes the second communication passage 033 before the first communication passages 030 are closed at the mid point in the compression stroke. Reference numeral 036 designates a rotary valve having, in the peripheral portion, cutouts functioning as the first control valves 038 and the second control valve 037. Reference numeral 031 designates an opening, on the combustion chamber side, of each of the first communication passages 030, i.e., high compression gas intake opening. 032 is an opening, on the chamber portion side, of each of the first communication passages 030. 034 is an air-fuel mixture supply opening, opened on the combustion chamber side, of the second communication passage 033. Furthermore, 035 is an opening, on the chamber portion side, of the second communication passage 033.

A pair of right and left fuel injectors 041 are mounted in the cylinder block 3 in such a manner as to be disposed on both sides of the chamber portion 029 in the lateral direction. Immediately before the second control valve 037 opens the second communication passage 033, fuel injected from the fuel injectors 041 is obliquely streamed, from below, in an air-fuel mixture forming space 044 (see FIG. 12) formed by the cutout functioning as the second control valve 037. To be more specific, the fuel is streamed at an approximately central portion of the second communication passage 033 (see FIG. 13).

The air-fuel mixture is formed as follows: namely, when the second control valve 037 opens the second communication passage 033 along with rotation of the rotary valve 036, high compression gas charged in the chamber portion 029 flows in the second communication passage 033 from the chamber side opening 035 of the second communication passage 033, to be mixed with standby fuel. The air-fuel mixture thus formed is then press-fed by high pressure in the chamber portion 029, to be injected from the air-fuel supply opening 034 into the combustion chamber 013.

The internal combustion engine of this type, at the initial state of scavenging, the scavenging is performed only by air, and therefore, fuel (rich air-fuel mixture) press-fed to the combustion chamber by means of the above means flows in the combustion chamber having been sufficiently scavenged with air, to thereby form an air-fuel mixture having a suitable concentration in the combustion chamber. The air-fuel mixture thus formed is desirably burned in the combustion chamber. As a result, the engine of this type is advantageous in attaining high level fuel consumption performance and high exhaust gas purifying performance.

According to the above-described background art internal combustion engine, fuel is injected from the fuel injectors 041 directly toward the air-fuel mixture forming space 044 formed by the cutout functioning as the second control valve 037, and the fuel injection begins immediately before the second control valve 037 opens the second communication passage 033. Accordingly, part of the stream of fuel strongly sprayed, from below, from the fuel injectors 041 to the rotary valve 036 may be often impinged on the bottom of the groove (cutout) of the rotary valve 036, to be splashed therefrom in the lateral direction, with a result that the splashed fuel may be often scattered in the chamber portion 029 to adhere on the inner wall of the chamber portion 029. The amount of fuel adhering on the inner wall of the chamber portion 029 causes an error to the weighed amount of fuel supplied from the fuel injectors 041. To cope with such an inconvenience, according to the background art internal combustion engine, it has been required to supply a larger amount of fuel, capable of compensating for the amount of fuel adhering on the inner wall of the chamber portion 029. An object of the present invention is to eliminate the scattering of fuel in the chamber portion 029 due to impingement of the stream of fuel on the rotary valve.

SUMMARY OF THE INVENTION

To solve the above problem, according to the present invention, there is provided a two-cycle internal combustion engine including a combustion chamber; a chamber portion adjacent to the combustion chamber; a communication passage between the combustion chamber and the chamber portion; and a control valve, provided in the communication passage, for opening the communication passage nearly at a point of time when a scavenging opening is closed and closing the communication passage at a mid point in the compression stroke, wherein an air-fuel mixture flows from the chamber portion side into the combustion chamber via the communication passage by operating the control valve. The above two-cycle internal combustion engine is characterized as follows:

(1) A portion, on the chamber portion side, of the communication passage is taken as a gas passage for communicating the control valve to the chamber portion, and a fuel injector for injecting fuel is provided at a mid point in the gas passage via a connection passage in such a manner as to be directed to the inner wall surface of the gas passage while being slightly tilted toward the control valve.

With this configuration, since fuel is injected toward the control valve but is not directly impinged on the control valve, it is possible to reduce the degree of scattering of the fuel on the chamber portion side due to splashing of the fuel from the control valve, and hence to obtain an air-fuel mixture having an accurate air-fuel ratio.

(2) In the two-cycle internal combustion engine described in the item (1), a fuel sump recess is provided in a cylinder block at a boundary between the control valve and the gas passage.

With this configuration, until the control valve is opened after fuel having been impinged on the inner wall of the gas passage reaches the position of the control valve in a state before being opened, the fuel is captured in the fuel sump recess (space), and consequently, it is possible to prevent splashing of the fuel from the control valve and hence to positively supply the fuel into the combustion chamber at the time of starting the opening of the control valve.

(3) In the two-cycle internal combustion engine described in the item (2), fuel is injected from the fuel injector into the fuel sump recess.

With this configuration, it is possible to more positively capture fuel in the recess, and hence to more effectively prevent splashing of fuel.

(4) In the two-cycle internal combustion engine described in the item (1) or (3), fuel is diffusely injected from the fuel injector so that the spray of fuel is not spread in the axial line direction of the gas passage but is spread in a fan-shape in the direction perpendicular to both the axial line of the gas passage and the axial line of the fuel injector.

With this configuration, it is possible to more positively spread fuel in the gas passage or in the fuel sump recess.

(5) In the two-cycle internal combustion engine described in the item (1) or (3), the fuel injector is disposed in such a manner that the tip of the fuel injector does not project in the gas passage.

With this configuration, it is possible to extend a spraying distance of fuel from the tip of the fuel injector to the inner wall of the gas passage, and to reduce the disturbance of the gas flow and hence to make the amount of fuel adhering and remaining on the inner wall of the gas passage as small as possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 4(a) to 4(c) are views showing the rotary valve used in the first embodiment, wherein FIG. 4(a) is a longitudinal sectional view of the rotary valve; FIG. 4(b) is a sectional view taken on line I—I of FIG. 4(a); and FIG. 4(c) is a sectional view taken on line II—II of FIG. 4(a);

FIGS. 10(a) and 10(b) are views showing the rotary valve used in the third embodiment, wherein FIG. 10(a) is a longitudinal sectional view of the rotary valve, and FIG. 10(b) is a sectional view taken on line 111—111 of FIG. 10(a);

DESCRIPTION OF THE PREFERRED EMBODIMENTS

Figure 1:
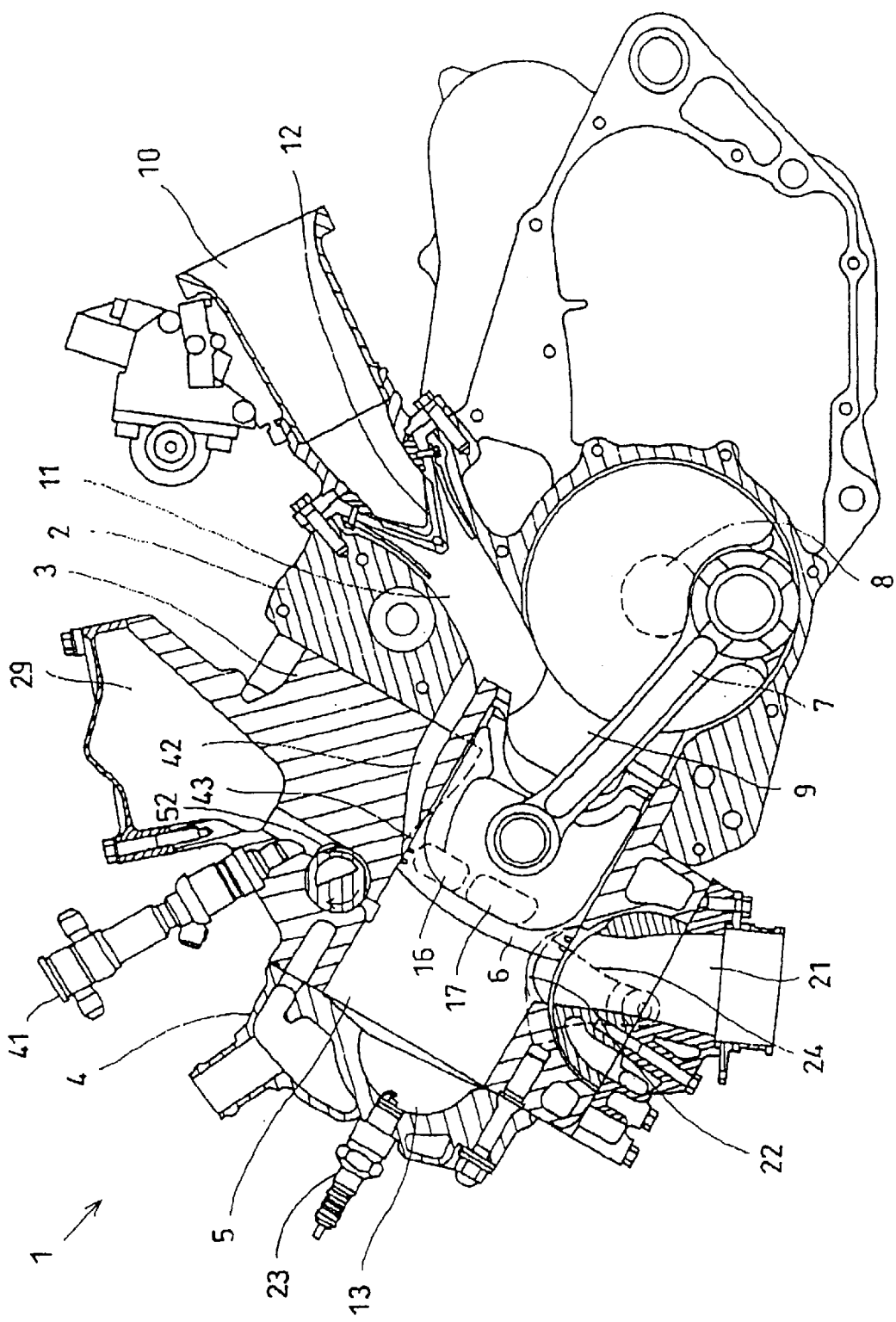
FIG. 1 is a longitudinal sectional view of a two-cycle internal combustion engine according to a first embodiment of the present invention.
Figure 2:
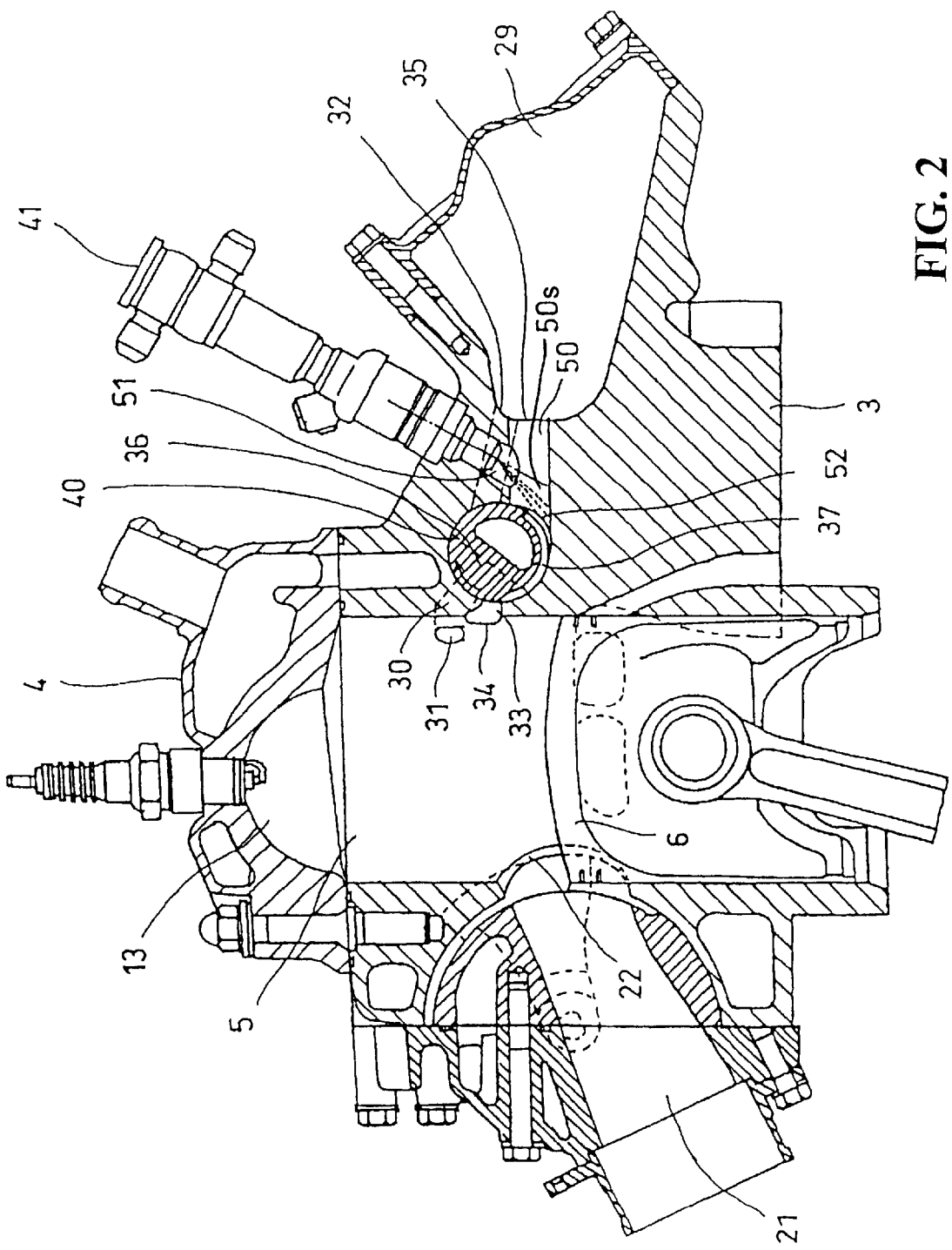
FIG. 2 is an enlarged view of an essential portion shown in FIG. 1.
Figure 3:
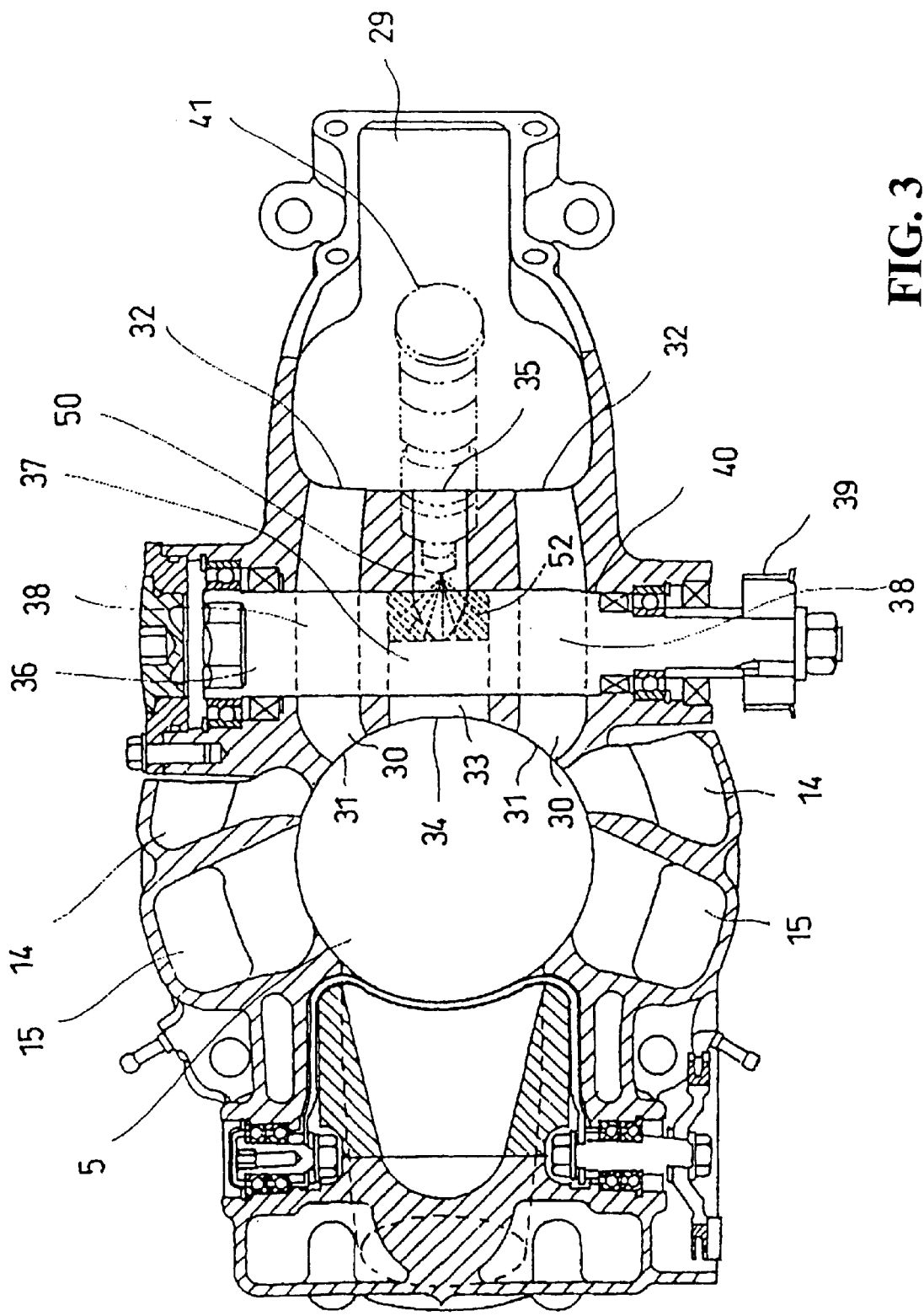
FIG. 3 is a horizontal sectional view cut along a cross-sectional plane passing through a rotary valve shown in FIG. 2.
Figure 4A:
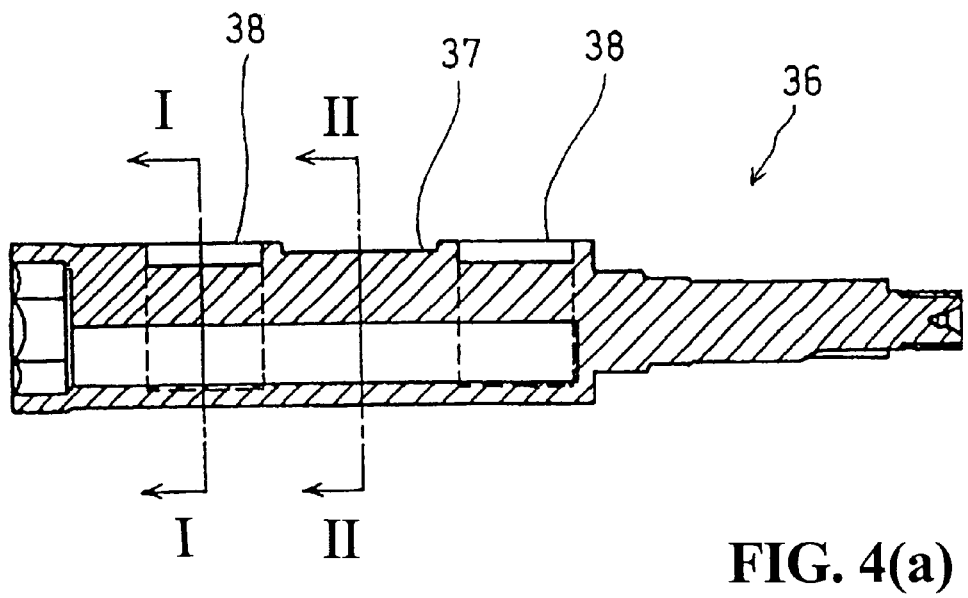
Figure 4B:
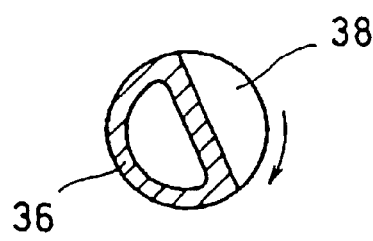
Figure 4C:
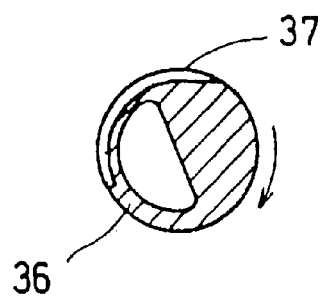
Figure 5:
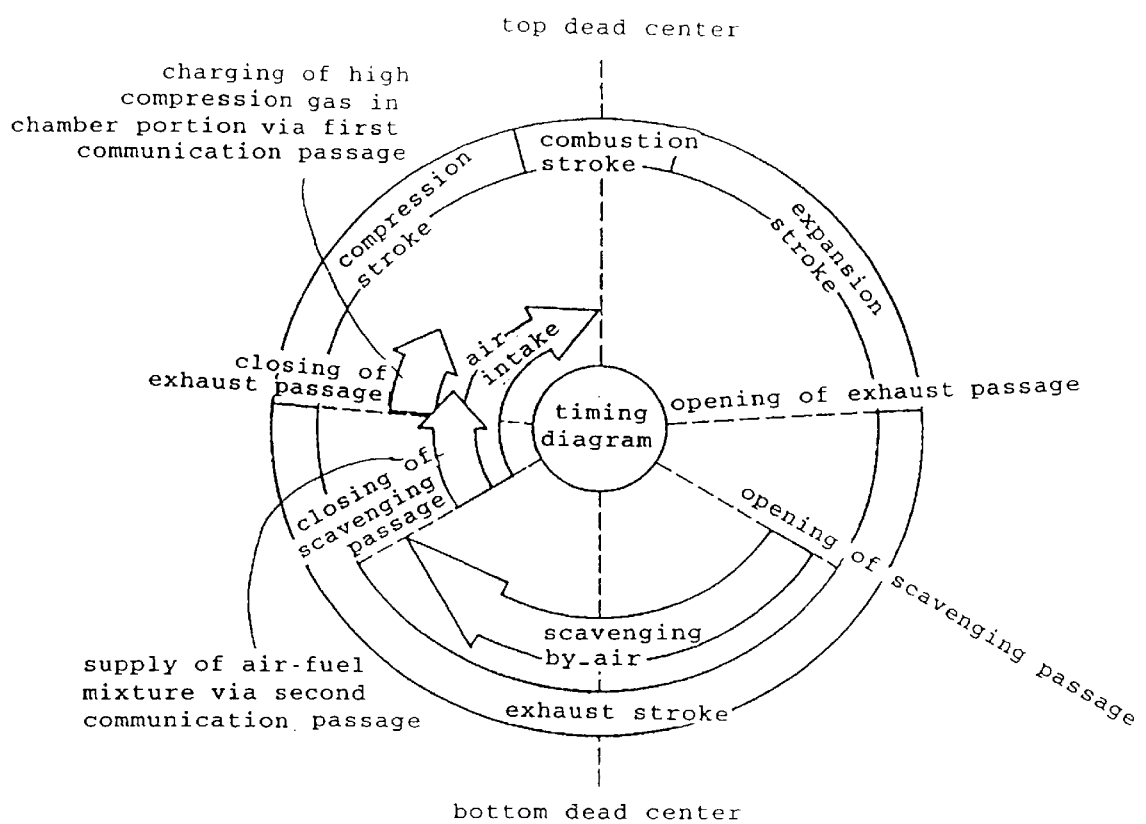
FIG. 5 is a diagram illustrating an operational cycle of the two-cycle internal combustion engine according to the first embodiment.

Hereinafter, a first embodiment of the present invention will be described with reference to FIGS. 1 to 5. FIG. 1 is a vertical sectional side view of a spark ignition type two-cycle internal combustion engine according to the first embodiment of the present invention; FIG. 2 is an enlarged view of an essential portion of the engine shown in FIG. 1; FIG. 3 is a horizontal sectional view cut along a cross-sectional plane passing through a rotary valve in FIG. 2; FIGS. 4(a), 4(b), and 4(c) are sectional views showing the rotary valve; and FIG. 5 is a diagram illustrating an operational cycle of the two-cycle internal combustion engine according to this embodiment.

Referring to FIG. 1, a spark ignition type two-cycle internal combustion engine 1 is for being mounted to a motorcycle (not shown). In the engine 1, a cylinder block 3 and a cylinder head 4 are sequentially stacked on a crankcase 2 and are integrally joined to each other.

A piston 6 is fitted in a cylinder bore 5 formed in the cylinder block 3 in such a manner as to be vertically slidable along the center line direction of the cylinder bore 5. The piston 6 is connected to a crankshaft 8 via a connecting rod 7, so that the crankshaft 8 in a crank chamber 9 is rotated along with upward/downward movement of the piston 6.

An intake passage 10 extending from the rear side to the front side of the vehicular body is connected to an intake passage 11 of the crankcase 2. A throttle valve (not shown) and a reed valve 12 are interposed in series in the intake passage 11. The throttle valve is connected to a throttle grip (not shown) via a connecting means (not shown). The opening degree of the throttle valve is increased by twisting the throttle grip in one direction.

Five scavenging passages for supplying air are formed in the crankcase 2 and the cylinder block 3: two pairs of right and left scavenging passages 14 and 15 (see FIG. 3) for communicating an upper portion of the cylinder bore 5 and the crank chamber 9, and one scavenging passage 42 (see FIG. 1) for communicating an upper portion of the cylinder 5 to a portion, on the downstream side from the reed valve 12, of the intake passage 11. The ends, on the cylinder bore 5 side, of the scavenging passages 14, 15, and 42 form openings 16, 17, and 43, respectively (see FIG. 1).

An exhaust opening 22, on the cylinder bore 5 side, of an exhaust passage 21 extends to a position higher than the positions of the openings 16, 17, and 43 of the scavenging passages 14, 15, and 42. Reference numeral 24 designates an exhaust control valve provided near the exhaust opening 22 of the exhaust passage 21. The exhaust control valve 24 is operative for changing the height of the upper edge of the exhaust opening 22, thereby changing an exhaust timing and also changing the cross-section of the exhaust passage 21. An approximately semi-spherical combustion chamber 13 is disposed above the cylinder bore 5 in such a manner as to be offset to the exhaust opening 22. An ignition plug 23 is mounted to the combustion chamber 13.

Referring to FIGS. 1 and 2, a chamber portion 29 is provided in a portion, offset to the rear side of the vehicular body, of the cylinder block 3. Referring to FIG. 3, a pair of right and left first communication passages 30 for communicating the chamber portion 29 to the cylinder bore 5 are provided in the cylinder block 3, and a second communication passage 33 is provided between the right and left first communication passages 30. Reference numeral 31 designates an opening, on the cylinder bore 5 side, of each of the first communication passages 30. Furthermore, 34 is an opening, on the cylinder bore 5 side, of the second communication passage 33. As shown in FIG. 2, the opening 31 of each of the first communication passages 31 is located at a vertical position higher than that of the exhaust opening 22, and the opening 34 of the second communication passage 33 is located at a vertical position nearly equal to that of the upper end of the exhaust opening 22. In FIG. 3, reference numeral 32 designates an opening, on the chamber portion 29 side, of each of the first communication passages 30, and 35 is an opening, on the chamber portion 29 side, of the second communication passage 33.

Referring to FIGS. 2 and 3, a valve housing hole 40 is provided in such a manner as to cross middle portions of the first communication passages 30 and the second communication passage 33. A rotary valve 36 is rotatably fitted in the valve housing hole 40. The rotary valve 36 is rotated at the same rotational speed as that of the crankshaft 8 in the rotational direction reversed to the rotational direction of the crankshaft 8 by a transmission mechanism (not shown). In FIG. 3, reference numeral 39 designates a pulley mounted to one end of the rotary valve 36. The transmission mechanism (not shown) is wound around the pulley 39.

FIGS. 4(a) to 4(c) are views showing the rotary valve 36, wherein FIG. 4(a) is a longitudinal sectional view of the rotary valve; FIG. 4(b) is a sectional view taken on line I—I of FIG. 4(a), showing the shape of each of first control valves 38 disposed in the first communication passages 30; and FIG. 4(c) is a sectional view taken on line II—II of FIG. 4(a), showing the shape of a second control valve 37 disposed in the second communication passage 33.

A high compression gas flows in the first communication passages 30 in the direction from the combustion chamber 13 to the chamber portion 29, and an air-fuel mixture or high compression gas in a state before formation of the air-fuel mixture flows in the second communication passage 33 in the direction from the chamber portion 29 to the combustion chamber 13. The above flow of the high compression gas in the first communication passages 30 is opened or closed at a specific timing by the first control valves 38 shown in FIG. 4(b), and the air-fuel mixture or the high compression gas in the state before formation of the air-fuel mixture in the second communication passage 33 is opened or closed with a specific timing by the second control valve 37 shown in FIG. 4(c).

The first control valve 38 is configured as a semicircle-shaped cutout, which is formed by cutting a portion of a rotary body as the material of the rotary valve 36 along a line connecting both ends of a circular-arc, having a specific length, of the outer periphery of the rotary body. The second control valve 37 is configured as a cutout having a specific length in the circumferential direction and a specific depth. Both edge portions of the second control valve 37 are formed so as not to be stepped for allowing an air-fuel mixture to be linearly, smoothly sprayed.

A high compression gas flows in the second communication passage 33 from the opening 35 on the chamber 29 side and is mixed with injected fuel in a mid portion of the second communication passage 33. When the second control valve 37 is opened, the air-fuel mixture thus formed is supplied from the opening 34, on the combustion chamber side, of the second communication passage 33 into the combustion chamber 13. The second communication passage 33 has an upstream side portion from the rotary valve 36 and a downstream side portion from the rotary valve 36. As shown in FIGS. 2 and 3, the axial lines of the upstream side portion and the downstream side portion of the second communication passage 33 are offset from each other, and the cross-sectional shapes thereof are also different from each other. For convenience in the following description, the upstream side (chamber portion side) portion from the rotary valve 36 of the second communication passage 33 is hereinafter referred to as "gas passage 50". The gas passage 50 is formed into a circular shape in cross-section. In particular, the lower side inner peripheral surface of the gas passage 50 is tangentially connected to the inner peripheral surface of the valve housing hole 40 without the occurrence of any stepped portion.

Referring to FIG. 2, a fuel injector 41 is fitted, from the outside, in an upper portion of the cylinder block 3 at a position between the rotary valve 36 and the chamber portion 29. The fuel injector 41 is tilted with respect to the axial line of the gas passage 50. The tip portion of the fuel injector 41 is in communication with the gas passage 50 via a connecting passage 51 tilted in the same direction as the tilt direction of the fuel injector 41.

Fuel is injected from the fuel injector 41 to the inner wall surface 50s of the gas passage 50. The fuel injecting direction is tilted toward the rotary valve 36; however, the tilt angle of the fuel injecting direction is set to a value not allowing direct impingement of the injected fuel on the second control valve 37. The fuel injecting direction can be altered by changing the direction of a nozzle of the fuel injector 41. Accordingly, fuel can be injected in a direction different from the axial line direction of the fuel injector 41. In FIG. 2, a state in which fuel is injected from the tip of the fuel injector 41 in a direction different from the axial line direction of the fuel injector 41 is shown by radial dashed lines.

The above setting of the fuel injecting direction allows fuel to be impinged on the inner wall of the gas passage 50 along the direction of the gas flow, more specifically, allows fuel not to be directly impinged on the second control valve 37. As a result, it is possible to reduce the degree of splashing of fuel from the second control valve 37 and thereby the degree of scattering of the splashed fuel to the chamber portion side, and hence to obtain an air-fuel mixture having an accurate air-fuel ratio.

The fuel injector 41 is disposed in such a manner that the tip thereof does not project in the gas passage 50, i.e., the tip is housed in the connecting passage 51. The reason for this is to extend a spraying distance of fuel from the tip of the fuel injector 41 to the inner wall of the gas passage 50, and to reduce the disturbance of the gas flow and hence to make the amount of fuel adhering and remaining on the inner wall of the gas passage 50 as small as possible.

In FIG. 2, a portion having a crescent-shaped cross-section, designated by reference numeral 52, is a fuel sump recess (space) formed in the cylinder block 3 at a boundary between the second control valve 37 and the gas passage 50. In FIG. 3, a portion hatched by dashed lines, designated by reference numeral 52, is the surface of the recess formed in the cylinder block 3. The provision of the recess 52 exhibits the following effect: namely, until the second control valve 37 is opened after fuel having been impinged on the inner wall of the gas passage 50 reaches the second control valve 37, the fuel is captured in the fuel sump recess 52. Consequently it is possible to prevent counterflow of the fuel to the chamber portion side and hence to positively supply the fuel into the combustion chamber when the second control valve 37 begins to be opened. Additionally, by injecting fuel toward the recess, or into the recess, it is possible to more positively capture the fuel and hence to prevent splashing of the fuel.

A passage portion, facing toward the second control valve 37, of the cylinder side portion of the second communication passage 33 begins to be opened from below or from above depending on the rotational direction of the second control valve 37. In the figures illustrating the first embodiment, such a portion is depicted as beginning to be opened from below. If the portion is configured as beginning to be opened from above, the rotational direction of the rotary valve 36 is reversed to that shown by an arrow in FIGS. 1 and 2; the fore and aft relationship of the shape of the cutout of each of the control valves 37 and 38 is reversed to that shown in FIGS. 4(a) to 4(c); and the connection between the rotary valve 36 and the gas passage 50 is changed such that the upper side generating line of the gas passage 50 is tangentially connected to the upper side of the periphery of the rotary valve 36. With respect to the fuel sump recess 52 provided in the cylinder block 3 at the boundary between the second control valve 37 and the gas passage 50, since the gas passage 50 is connected to the upper side of the second control valve 37, the recess 52 is provided at a position facing toward the upper half of the rotary valve 36. In summary, if the position of the passage portion, facing toward the second control valve 37 and beginning to be opened, of the cylinder side portion of the second communication passage 33 is reversed in the vertical direction, the rotational direction of the rotary valve 36 shown by the arrow in the figures is reversed; the fore and aft relationship of the shape of the second control valve 37 is reversed; and the position of the rotary valve 36 relative to the gas passage 50 and the fuel sump recess 52 is reversed in the vertical direction. The relationship associated with the opening position described here will be applied to a second embodiment and a third embodiment to be described later.

Fuel is diffusely injected from the fuel injector 41 so that the spray of fuel is not spread in the axial line direction of the gas passage 50 but is spread in a fan-shape in the direction perpendicular to both the axial line of the gas passage 50 and the axial line of the fuel injector 41. The reason for this is to positively spread the spray of fuel in the gas passage 50 or in the fuel sump recess 52. In FIG. 3, a state in which fuel is injected in a fan-shape from the tip of the fuel injector 41 is shown by dashed lines.

The injection of fuel begins immediately before the second communication passage 33 is opened by the second control valve 37, i.e., when the second control valve 37 is still closed. Subsequently, when the second communication passage 33 is opened by the second control valve 37, high compression gas charged in the chamber portion 29 flows in the gas passage 50 from the opening 35 and is mixed with standby fuel, and the air-fuel mixture thus formed is press-fed by high pressure in the chamber portion 29, to be injected from the opening 34 into the combustion chamber 13 via the communication portion of the second control valve 37 and the downstream passage portion of the second communication passage 33.

The opening/closing timings of the first control valves 38 and the second control valve 37 will be described below. Referring to FIG. 5, the first control valves 38 open the first communication passages 30 nearly at a point of time when the exhaust opening 22 is closed, and close the first communication passages 30 at a mid point in the compression stroke. During the period of time in which the first communication passages 30 is kept open, high compression gas in the combustion chamber 13 is charged from the high compression gas intake openings 31 of the first communication passages 30 into the chamber portion 29.

On the other hand, the second control valve 37 opens the second communication passage 33 nearly at a point of time when the scavenging openings 16, 17, and 43 are closed, and closes the second communication passage 33 before the first communication passages 30 are closed at the mid point in the compression stroke. During the period of time in which the second communication passage 33 is kept open, an air-fuel mixture is supplied, i.e., injected from the chamber portion 29 into the combustion chamber 13. In this way, the period of time in which the high compression gas is charged into the chamber portion 29 and the period of time in which the air-fuel mixture is supplied into the combustion chamber 13 are set to be partially overlapped.

The operational cycle of the two-cycle internal combustion engine 1 configured as described above will be described with reference to FIG. 5. As the crankshaft 8 is rotated clockwise in FIG. 1 by a starter motor (not shown), the piston 6 is moved upwardly. At a point of time of 90° before top dead center, the exhaust opening 22 is closed by the piston 6. The operational cycle thus enters the compression stroke. At this time, the first control valves 38 are opened to open the first communication passages 30, whereby high compression gas in the combustion chamber 13 is charged into the chamber portion 29 via the first communication passages 30.

The air-fuel mixture supply opening 34 is closed by the piston 6 at a point of time of about 75° before top dead center, and subsequently, the high compression gas intake openings 31 are closed by the piston 6. The supply of the air-fuel mixture into the combustion chamber 13 and the charging of high compression gas into the chamber portion 29 are sequentially ended.

The combustion chamber 13 is further compressed, and the air-fuel mixture is ignited by the ignition plug 23 with a specific timing before top dead center, while the crank chamber 9 continues to be expanded by upward movement of the piston 6, whereby air suction in the crank chamber 9 continues.

After the piston 6 reaches top dead center, the air-fuel mixture in the combustion chamber 13 is burned and thereby the combustion chamber 13 expands, while the air in the crank chamber 9 is compressed by downward movement of the piston 6.

At a point of time of 90° past top dead center, the exhaust opening 22 is opened (which is varied depending on the vertical position of the exhaust control valve 24), to discharge the burned gas.

At a point of time of about 122° past top dead center, the scavenging openings 16, 17, and 43 are opened by downward movement of the piston 6, so that compressed air (containing no fuel) in the crank chamber 9 flows from the scavenging openings 16, 17, and 43 into the combustion chamber 13, whereby the burned gas in the combustion chamber 13 is pushed into the exhaust opening 22, thereby performing scavenging with only air, and simultaneously fuel is injected from the fuel injector 41 into the gas passage 50.

At a point of time of about 58° past the bottom dead center, the scavenging openings 16, 17, and 43 are closed with the upward movement of the piston 6, so that the scavenging by the flow-in of air from the scavenging openings 16, 17, and 43 is stopped, and nearly from this point of time, the second control valve 37 opens the second communication passage 33, to inject an air-fuel mixture into the combustion chamber 13. At the same time, air is sucked into the crank chamber 9 from the intake passage 10 via the reed valve 12 by expansion of the crank chamber 9 due to upward movement of the piston 6.

Figure 6:
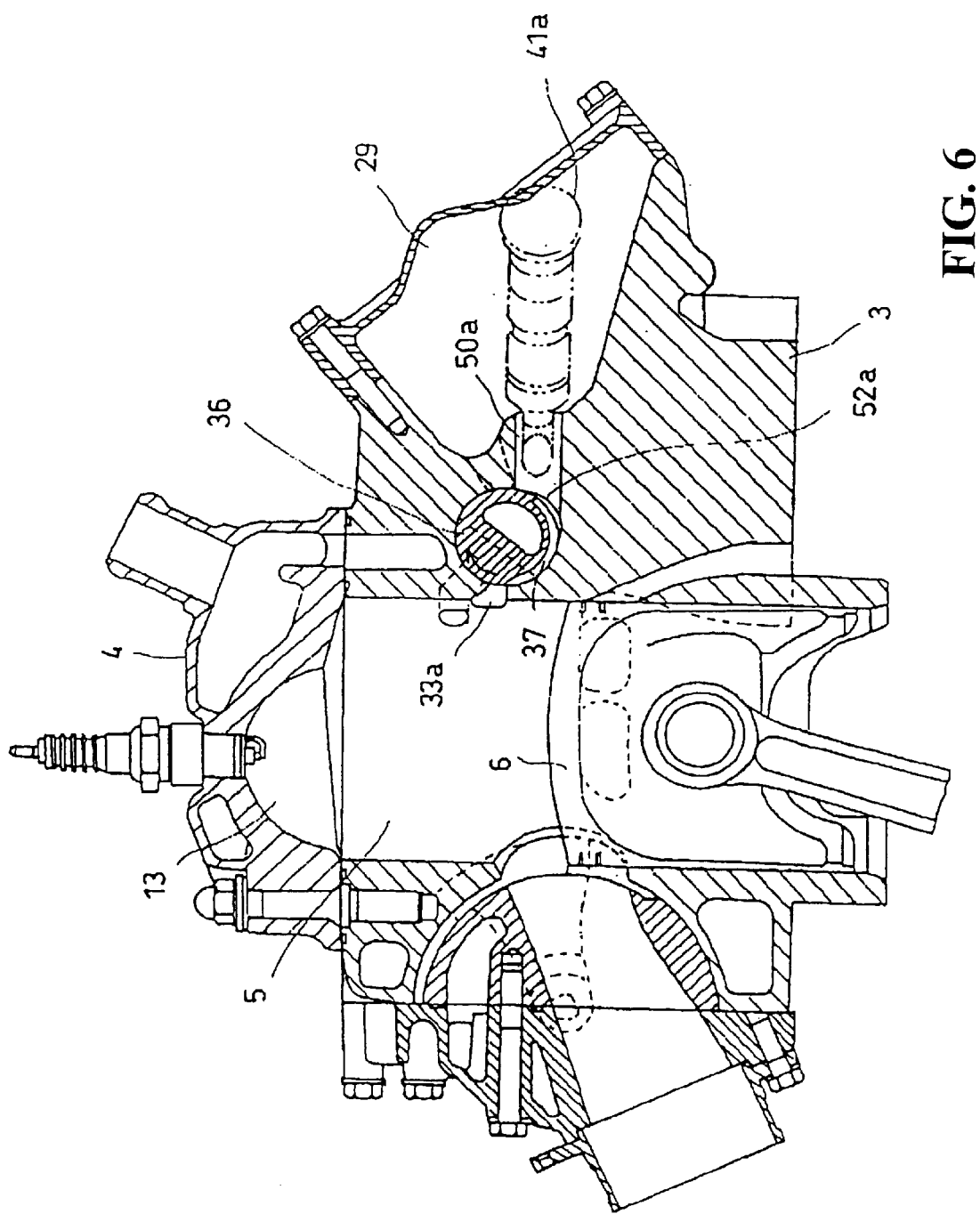
FIG. 6 is a longitudinal sectional view of an essential portion of a two-cycle internal combustion engine according to a second embodiment of the present invention.

A second embodiment of the present invention will be described below. FIG. 6 is a longitudinal sectional view of an essential portion of a spark ignition type internal combustion engine according to the second embodiment of the present invention, and FIG. 7 is a horizontal sectional view cut along a cross-sectional plane passing through a rotary valve shown in FIG. 6.

In these figures, a chamber portion 29 is provided in a portion, offset to the rear side of the vehicular body, of a cylinder block 3. A pair of right and left first communication passages 30 for communicating the chamber portion 29 to a cylinder bore 5 are provided in the cylinder block 3, and a second communication passage 33a is provided between the right and left first communication passages 30. The first communication passages 30 allow high compression gas to flow from the cylinder bore 5 into the chamber portion 29, and the second communication passage 33a allows an airfuel mixture to flow from the chamber portion 29 into the cylinder bore 5. The shape of the first communication passage 30 is the same as that of the first communication passage 30 in the first embodiment. With respect to the second communication passage 33a, the shape of a passage portion from the rotary valve 36 to the combustion chamber 13 is the same as that of the corresponding passage portion in the first embodiment, but the shape of a passage portion from the rotary valve 36 to the chamber portion 29 is different from that of the corresponding passage portion in the first embodiment.

The passage portion, located between the rotary valve 36 and the chamber portion 29, of the second communication passage 33a is composed of two gas passages 50a disposed in parallel to each other. The gas passage 50a is formed into a circular tshape in cross-section. In FIG. 7, reference numeral 35a designates an opening, on the chamber portion 29 side, of each of the gas passages 50a. The gas passage 50 functions not only as a passage allowing gas stored in the chamber portion 29 to flow therethrough, but also as a space in which the gas is mixed with injected fuel.

Figure 7:
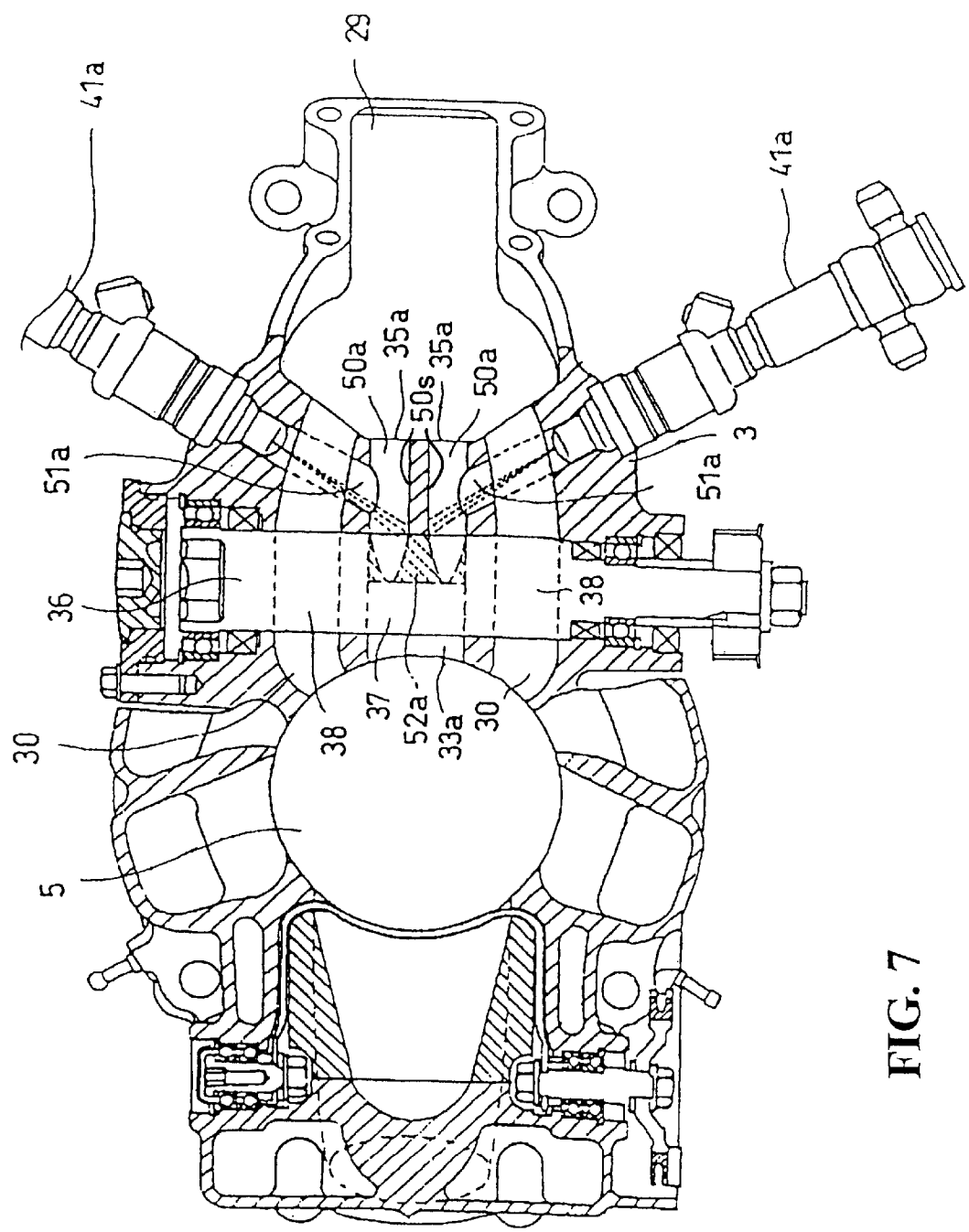
FIG. 7 is a horizontal sectional view cut along a cross-sectional plane passing through a rotary valve shown in FIG. 6.

Referring to FIG. 7, a connection passage 51a is connected to each of the gas passages 50a in such a manner as to extend slightly rearwardly therefrom in the horizontal direction. A fuel injector 41a is mounted to an outer end portion of each of the connecting passages 51a. Fuel is injected from the fuel injectors 41a to the inner wall surfaces 50s of the gas passages 50. The fuel injecting direction is slightly tilted toward the rotary valve 36.

The injection of fuel begins when a second control valve 37 for opening/closing the second communication passage 33a is closed, i.e., no gas flows in the gas passages 50a. Accordingly, the spray of fuel in the gas passages 50a is directed to the inner wall surfaces 50s of the gas passages 50 on the upstream side from the second control valve 37 in order to prevent counterflow of the spray of fuel due to the direct impingement of the injected fuel on the rotary valve 36. Since the tips of the fuel injectors 41a do not project into the gas passages 50a, it is possible to reduce the disturbance of gas flow and hence to reduce the amount of fuel adhering and remaining on the inner walls of the gas passages 50a.

In FIG. 6, a portion having a crescent-shaped cross-section, designated by reference numeral 52a, is a fuel sump recess (space) formed in the cylinder block 3 at a boundary between the inner wall of the second communication passage 33a and the outer peripheral surface of the rotary valve 36. In FIG. 7, a portion hatched by dashed lines, designated by reference numeral 52a, is the surface of the recess formed in the cylinder block 3. With this configuration, since the fuel having been impinged on the inner walls of the gas passages 50a is captured in the recess 52a when the fuel reaches the control valve in a state before being opened, the fuel can be positively supplied into the combustion chamber 13. By injecting fuel toward the fuel sump recess 52a, it is possible to more positively capture the fuel.

Fuel is diffusely injected from the fuel injectors 41a so that the spray of fuel is not spread in the axial line directions of the gas passages 50a but is spread in a fan-shape in the direction perpendicular to both the axial lines of the gas passages 50 and the axial lines of the fuel injectors 41a. With this configuration, it is possible to positively spread fuel in the gas passages 50a or in the fuel sump recess 52a.

The configurations and functions of parts other than those described above are the same as those of the corresponding parts in the first embodiment, and therefore, the overlapped description thereof is omitted.

Figure 8:
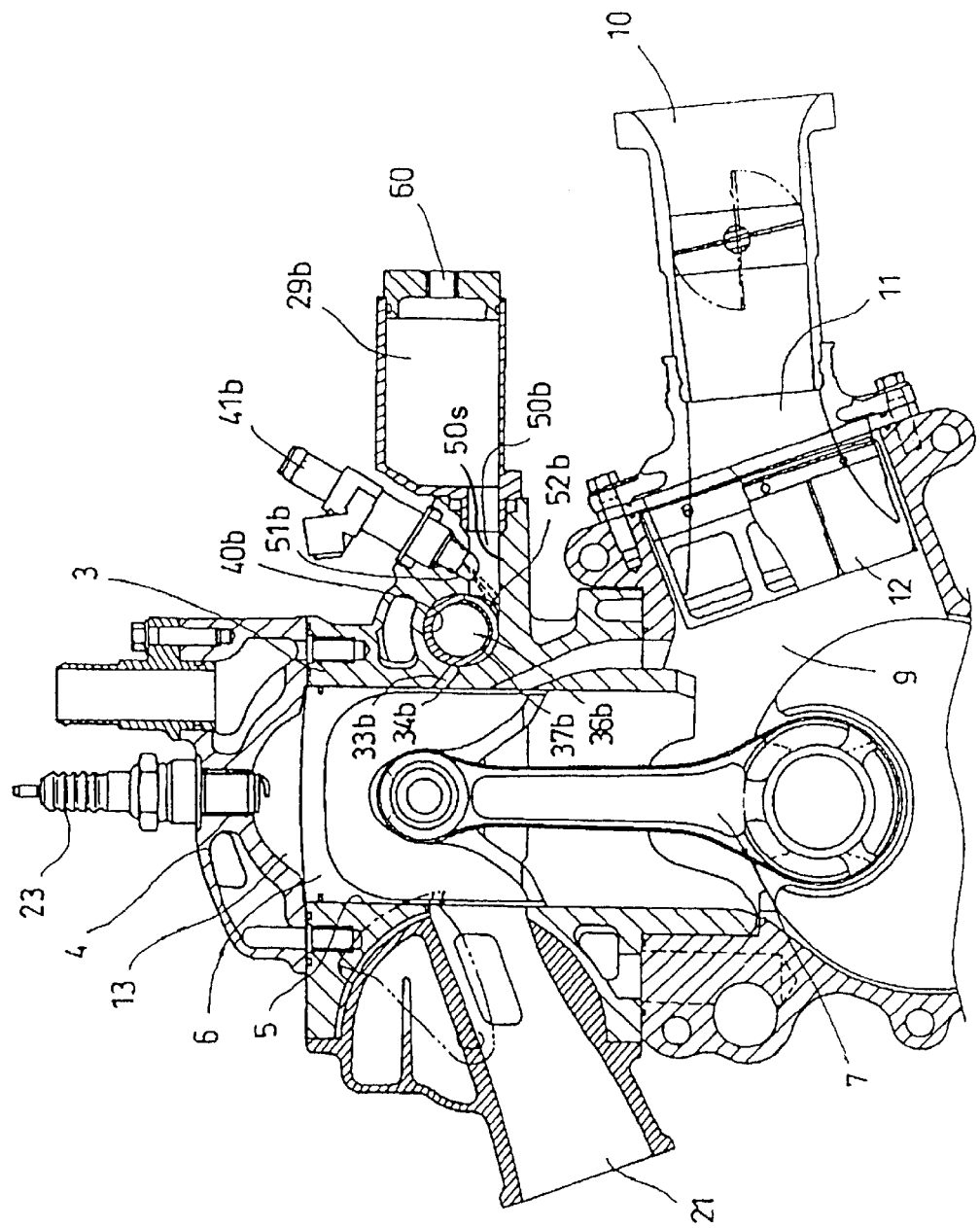
FIG. 8 is a longitudinal sectional view of an essential portion of a two-cycle internal combustion engine according to a third embodiment of the present invention.
Figure 9:
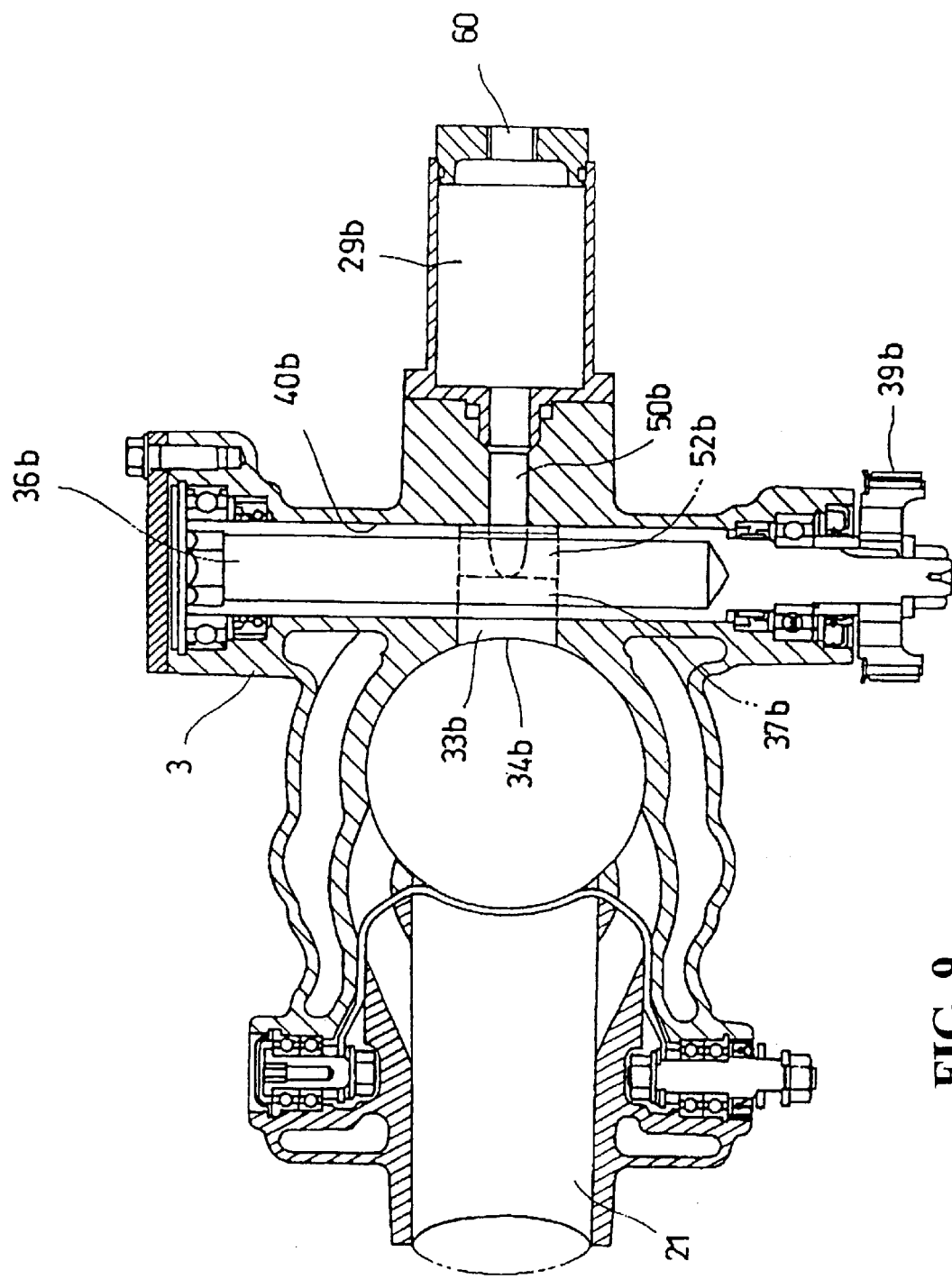
FIG. 9 is a horizontal sectional view cut along a cross-sectional plane passing through a rotary valve shown in FIG. 8.
Figure 10A:
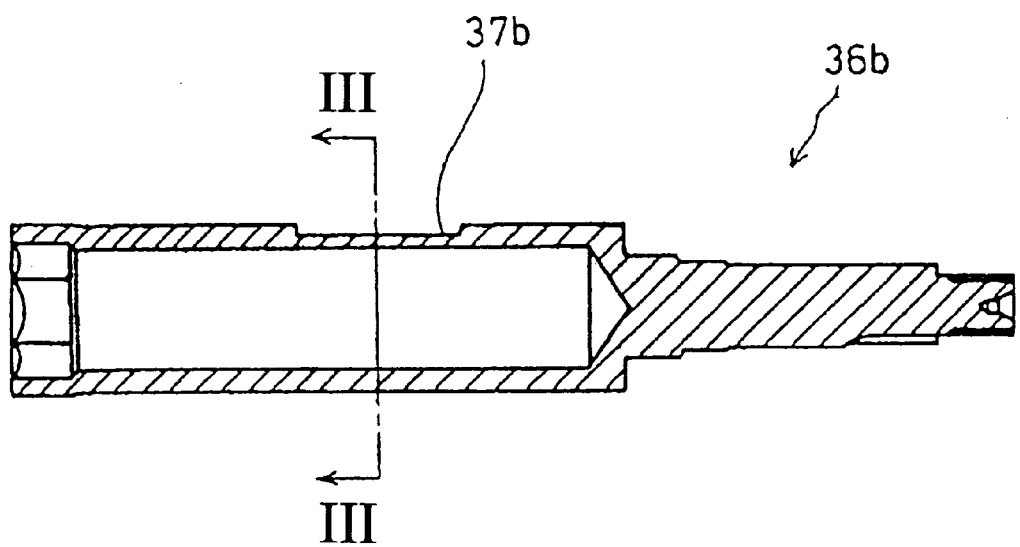
Figure 10B:
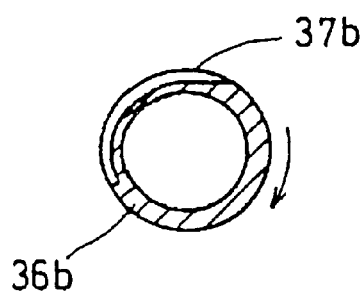
Figure 11:
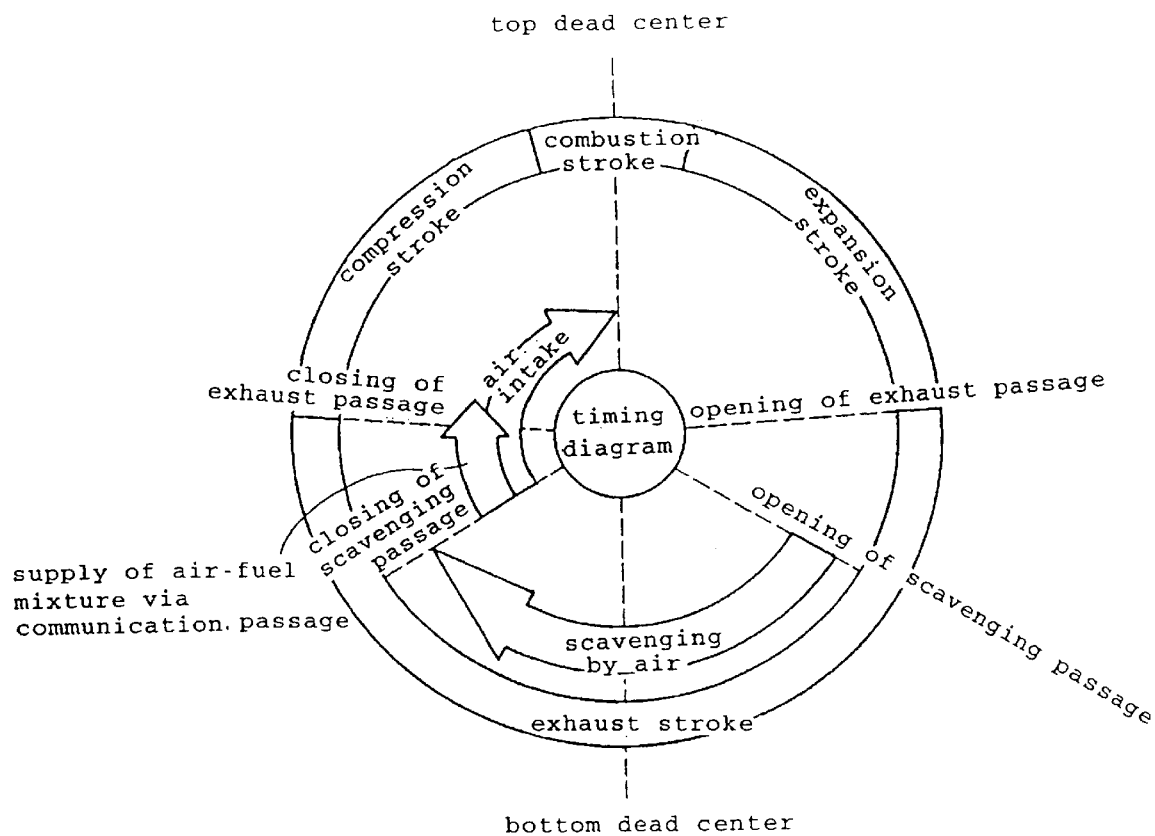
FIG. 11 is a diagram illustrating an operational cycle of the two-cycle internal combustion engine according to the third embodiment.
Figure 12:
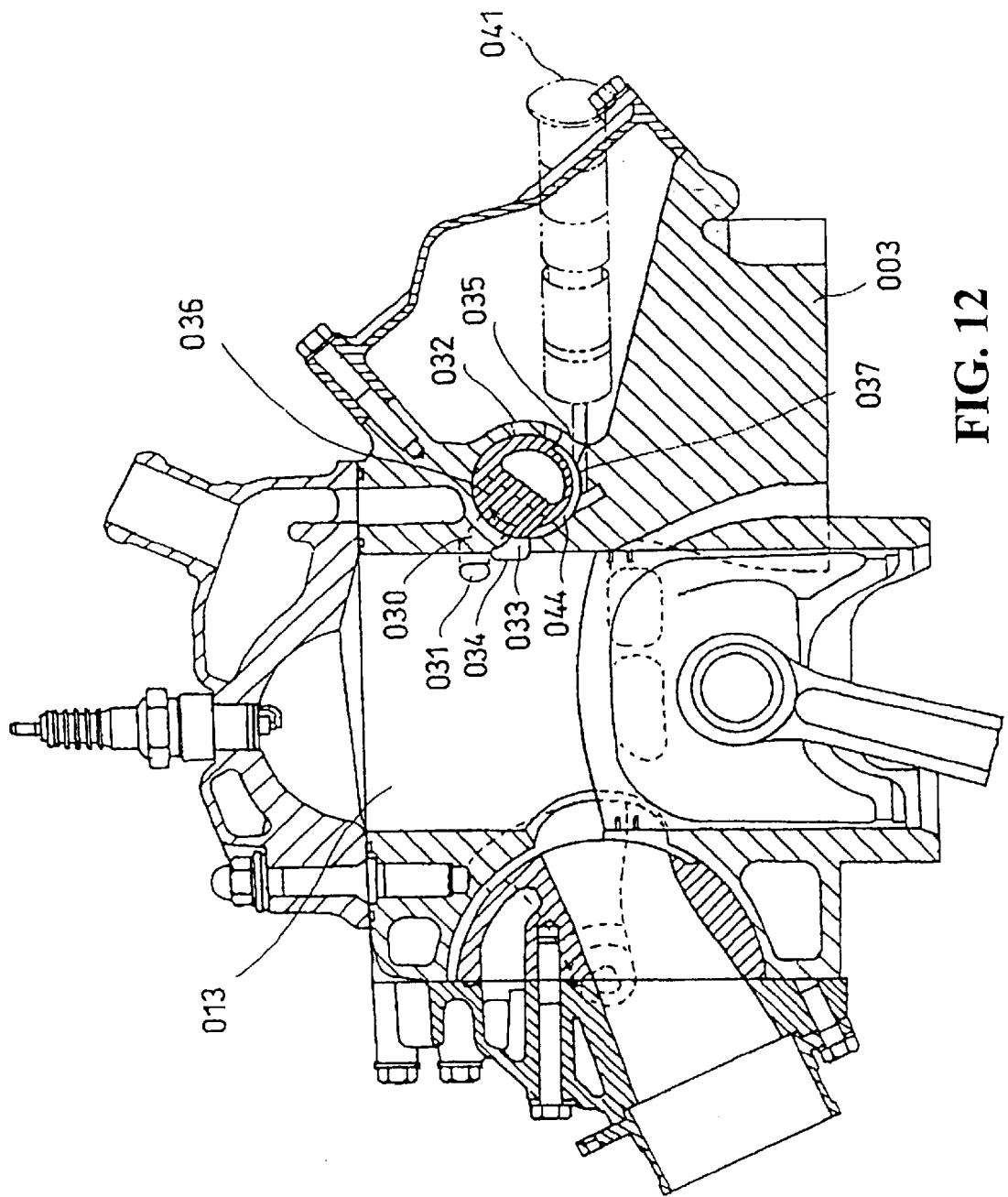
FIG. 12 is a longitudinal sectional view of an essential portion of a background art two-cycle internal combustion engine.
Figure 13:
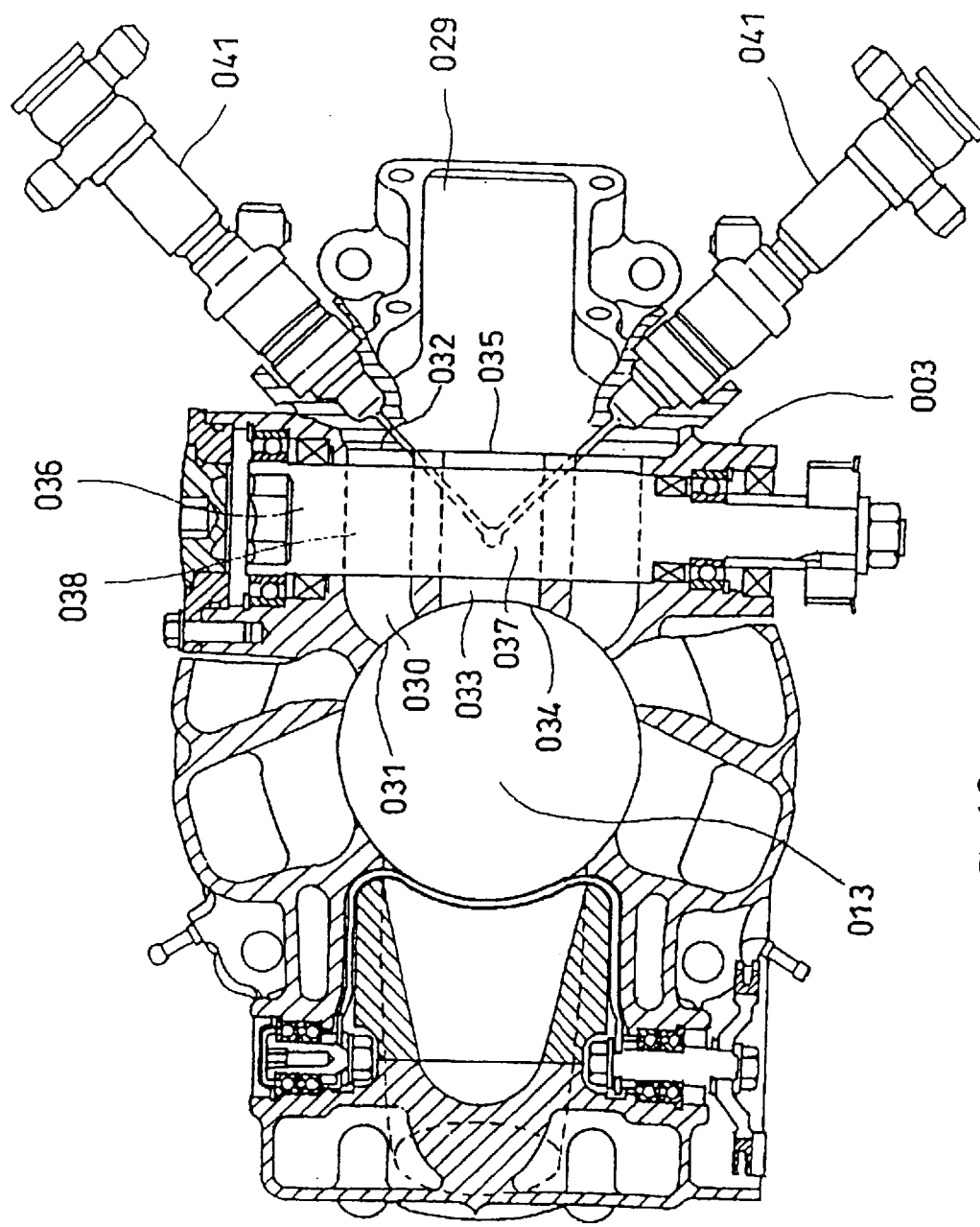
FIG. 13 is a horizontal sectional view cut along a cross-sectional plane passing through the rotary valve shown in FIG. 12.

A third embodiment of the present invention will be described below. FIG. 8 is a longitudinal sectional view of an essential portion of a spark ignition type two-cycle internal combustion engine according to the third embodiment of the present invention; FIG. 9 is a horizontal sectional view cut along a cross-sectional plane passing through a rotary valve shown in FIG. 8; FIGS. 10(a) and 10(b) are sectional views of the rotary valve according to this embodiment; and FIG. 11 is a diagram illustrating an operational cycle of the two-cycle internal combustion engine according to this embodiment.

In the first and second embodiments, high compression gas is supplied from the combustion chamber into the chamber portion via the first communication passages and the first control valves. However, in this embodiment, the first communication passages and the first control valves are omitted and high compression gas is supplied into the chamber portion by a pump (not shown) separately provided. Accordingly, in this embodiment, only the second communication passage and the second control valve are left as the communication passage and the control valve. Therefore, the adjective "second" is omitted, and the second communication passage and the second control valve are referred to simply as "communication passage" and "control valve", respectively.

Referring to FIGS. 8 and 9, a chamber portion 29b is provided in a portion, offset to the rear side of the vehicular body, of a cylinder block 3. Reference numeral 60 designates a pump connection port provided in one end surface of the chamber portion 29b. A pump (not shown) for injecting high compression gas is connected to the pump connection port 60. A communication passage 33b for communicating the chamber portion 29b to a cylinder bore 5 is provided in the cylinder block 3. The shape of the communication passage 33b and the vertical position of an opening 34b, on the cylinder bore 5 side, of the communication passage 33b are the same as those in the case of the second communication passage 33 in the first embodiment.

A valve housing hole 40b is provided in a mid portion of the communication passage 33b. The shape of a connecting portion between the communication passage 33b and the valve housing hole 40b is the same as the shape of the connecting portion between the second communication passage 33 and the valve housing hole 40 in the first embodiment. A rotary valve 36b is rotatably fitted in the valve housing hole 40b. The rotary valve 36b is rotated via a pulley 39b mounted to an end portion of the rotary valve 36b by a transmission mechanism (not shown).

FIGS. 10(a) and 10(b) show the rotary valve 36b, wherein FIG. 10(a) is a longitudinal sectional view of the rotary valve 36b, and FIG. 10(b) is a sectional view taken on line III—III of FIG. 10(a), showing the cross-sectional shape of a control valve 37b disposed in the communication passage 33b. The shape of the control valve 37b is the same as that of the second control valve 37 in the first embodiment. That is to say, the control valve 37b is formed as a cutout having a specific length in the peripheral direction and having a specific depth. The edges of the control valve 37b are formed so as not to be stepped for allowing an air-fuel mixture to be linearly, smoothly sprayed. The communication passage 33b allows an air-fuel mixture or high compression gas before formation of the air-fuel mixture to flow from the chamber portion 29b into the combustion chamber. The flow of the air-fuel mixture in the communication passage 33b is controlled to be opened or closed with a specific timing by the control valve 37b.

A passage portion, on the upstream side (chamber portion side) from the rotary valve 36b, of the communication passage 33b is hereinafter referred to as "gas passage 50b". The gas passage 50b is formed into a circular shape in cross-section. The lower side inner peripheral surface of the gas passage 50b is tangentially connected to the inner peripheral surface of the valve housing hole 40b without occurrence of any stepped portion. A fuel sump recess 52b formed into a crescent-shape in cross-section is provided. The position and shape of the recess 52b are the same as those of the recess 52 in the first embodiment.

Referring to FIG. 8, a fuel injector 41b is mounted, from above, in the cylinder block 3. The fuel injector 41b is tilted with respect to the axial line of the gas passage 50b. The tip of the fuel injector 41b is in communication with the gas passage 50b via a connecting passage 51b tilted in the same direction as the tilt direction of the fuel injector 41b. The mounting structure, mounting position, tilt angle, and the like of the fuel injector 41b are the same as those of the fuel injector in the first embodiment. The injecting function of the fuel injector 41b is the same as that in the first embodiment. That is to say, fuel is injected to the inner wall surface 50s of the gas passage 50b along the injecting direction slightly tilted to the control valve 37b. However, since the fuel is not directly impinged on the control valve 37b, it is possible to prevent splashing of the fuel from the control valve 37b and scattering of the splashed fuel to the chamber portion side, and hence to obtain an air-fuel mixture having an accurate air-fuel ratio.

As described above, since the fuel sump recess 52b is provided, when fuel having been impinged on the inner wall of the gas passage 50b reaches the position of the control valve 37b in a state before being opened, the fuel is captured in the recess 52b, so that it is possible to prevent splashing of the fuel and hence to positively supply the fuel into the combustion chamber. By injecting fuel from the fuel injector 41b into the fuel sump recess 52b, it is possible to more positively capture the fuel and hence to more effectively prevent splashing of the fuel. Furthermore, since fuel is diffusely injected from the fuel injector 41b so that the spray of fuel is not spread in the axial line direction of the gas passage 50b but is spread in a fan-shape in the direction perpendicular to both the axial line of the gas passage 50b and the axial line of the fuel injector 41b, it is possible to positively spread fuel in the gas passage 50b or in the fuel sump recess 52b. The tip of the fuel injector 41b does not project into the gas passage 50b. With this configuration, it is possible to extend a spraying distance of fuel from the tip of the fuel injector 41b to the inner wall of the gas passage 50b, and to reduce the disturbance of gas flow and hence to make the amount of fuel adhering and remaining on the inner wall of the gas passage 50b as small as possible.

FIG. 11 is a diagram illustrating an operational cycle of this embodiment. The operational cycle of this cycle is different from that of the first embodiment in that the process "Charging of High Compression Gas in Chamber Portion Via First Communication Passage" shown by the arrow in FIG. 5 is omitted. Since high compression gas is charged into the chamber portion from another gas source at any time by a pump (not shown), the process of charging high compression gas from the combustion chamber is omitted in this embodiment. The control valve 37b opens the communication passage 33b nearly at a point of time when the scavenging openings are closed, and closes the communication passage 33b at a mid point in the compression stroke. The other processes are performed like the first embodiment.

The configurations and functions of parts other than those described above are the same as the corresponding parts in the first embodiment, and therefore, the parts other than those described above are designated in the figures by the same reference numerals as those of the corresponding parts in the first embodiment and the overlapped description thereof is omitted.

(1) The fuel injector for injecting fuel is provided at a mid point in the gas passage via the connection passage in such a manner as to be directed to the inner wall surface of the gas passage while being slightly tilted toward the control valve. With this configuration, since fuel is injected toward the control valve but is not directly impinged on the control valve, it is possible to reduce the degree of scattering of the fuel on the chamber portion side due to splashing of the fuel from the control valve, and hence to obtain an air-fuel mixture having an accurate air-fuel ratio.

(2) The fuel sump recess is provided in the cylinder block at a boundary between the control valve and the gas passage. With this configuration, until the control valve is opened after fuel having been impinged on the inner wall of the gas passage reaches the position of the control valve in a state before being opened, the fuel is captured in the fuel sump recess (space), and consequently, it is possible to prevent splashing of the fuel from the control valve and hence to positively supply the fuel into the combustion chamber at the time of starting the opening of the control valve.

(3) Fuel is injected from the fuel injector into the fuel sump recess. With this configuration, it is possible to more positively capture fuel in the recess, and hence to more effectively prevent splashing of fuel.

(4) Fuel is diffusely injected from the fuel injector so that the spray of fuel is not spread in the axial line direction of the gas passage but is spread in a fan-shape in the direction perpendicular to both the axial line of the gas passage and the axial line of the fuel injector. With this configuration, it is possible to more positively spread fuel in the gas passage or in the fuel sump recess.

(5) The fuel injector is disposed in such a manner that the tip of the fuel injector does not project in the gas passage. With this configuration, it is possible to extend a spraying distance of fuel from the tip of the fuel injector to the inner wall of the gas passage, and to reduce the disturbance of the gas flow and hence to make the amount of fuel adhering and remaining on the inner wall of the gas passage as small as possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-cycle internal combustion engine, comprising:
   a combustion chamber;
   a chamber portion adjacent to said combustion chamber;
   a communication passage between said combustion chamber and said chamber portion;
   a control valve, provided in said communication passage, for opening said communication passage nearly at a point of time when a scavenging opening is closed, said control valve closing said communication passage at a mid point in the compression stroke, wherein an air-fuel mixture flows from said chamber portion side into said combustion chamber via said communication passage by operating said control valve;
   a portion, on the chamber portion side, of said communication passage is a gas passage for communicating said control valve to said chamber portion; and
   a fuel injector for injecting fuel is provided at a mid point in said gas passage and slightly tilted toward said control valve, said fuel being injected via a connection passage in such a manner as to be directed to an inner wall surface of said gas passage without allowing direct impingement of said fuel on said control valve.

2. A two-cycle internal combustion engine according to claim 1, wherein fuel is diffusely injected from said fuel injector so that the spray of fuel is not spread in an axial line direction of said gas passage, but is spread in a fan-shape in a direction perpendicular to the axial line of said gas passage and the axial line of said fuel injector.

3. A two-cycle internal combustion engine according to claim 1, wherein said fuel injector is disposed in such a manner that the tip of said fuel injector does not project in said gas passage.

4. A two-cycle internal combustion engine according to claim 1, wherein a fuel sump recess is provided in a cylinder block at a boundary between said control valve and said gas passage, wherein fuel injected onto the inner wall surface of the gas passage is captured in said fuel sump recess until said control valve is opened.

5. A two-cycle internal combustion engine according to claim 4, wherein fuel is injected from said fuel injector into said fuel sump recess.

6. A two-cycle internal combustion engine according to claim 5, wherein fuel is diffusely injected from said fuel injector so that the spray of fuel is not spread in an axial line direction of said gas passage, but is spread in a fan-shape in a direction perpendicular to both the axial line of said gas passage and the axial line of said fuel injector.

7. A two-cycle internal combustion engine according to claim 5, wherein said fuel injector is disposed in such a manner that the tip of said fuel injector does not project in said gas passage.

8. A fuel injecting assembly for a two-cycle internal combustion engine, the internal combustion chamber including a combustion chamber; a chamber portion adjacent to the combustion chamber; a communication passage between the combustion chamber and the chamber portion; and a control valve, provided in the communication passage, for opening the communication passage nearly at a point of time when a scavenging opening is closed, the control valve closing the communication passage at a mid point in the compression stroke, wherein an air-fuel mixture flows from the chamber portion side into the combustion chamber via the communication passage by operating the control valve, said fuel injecting assembly comprising:
   a portion, on the chamber portion side, of the communication passage is a gas passage for communicating the control valve to the chamber portion of the internal combustion engine; and
   a fuel injector for injecting fuel is provided at a mid point in said gas passage and slightly tilted toward said control valve, said fuel being injected via a connection passage in such a manner as to be directed to an inner wall surface of said gas passage without allowing direct impingement of said fuel on said control valve.

9. The fuel injecting assembly for a two-cycle internal combustion engine according to claim 8, wherein fuel is diffusely injected from said fuel injector so that the spray of fuel is not spread in an axial line direction of said gas passage, but is spread in a fan-shape in a direction perpendicular to the axial line of said gas passage and the axial line of said fuel injector.

10. The fuel injecting assembly for a two-cycle internal combustion engine according to claim 8, wherein said fuel injector is disposed in such a manner that the tip of said fuel injector does not project in said gas passage.

11. The fuel injecting assembly for a two-cycle internal combustion engine according to claim 8, wherein a fuel sump recess is provided in a cylinder block of the internal combustion engine at a boundary between the control valve and said gas passage, wherein said fuel injected onto the inner wall surface of the gas passage is captured in said fuel sump recess until said control valve is opened.

12. The fuel injecting assembly for a two-cycle internal combustion engine according to claim 11, wherein fuel is injected from said fuel injector into said fuel sump recess.

13. The fuel injecting assembly for a two-cycle internal combustion engine according to claim 12, wherein fuel is diffusely injected from said fuel injector so that the spray of fuel is not spread in an axial line direction of said gas passage, but is spread in a fan-shape in a direction perpendicular to both the axial line of said gas passage and the axial line of said fuel injector.

14. The fuel injecting assembly for a two-cycle internal combustion engine according to claim 12, wherein said fuel injector is disposed in such a manner that the tip of said fuel injector does not project in said gas passage.

* * * * *